US009097224B2

(12) United States Patent
Moscherosch et al.

(10) Patent No.: US 9,097,224 B2
(45) Date of Patent: Aug. 4, 2015

(54) MULTI-FUEL VEHICLE FUEL CONTROL SYSTEMS AND METHODS

(75) Inventors: Ben W. Moscherosch, Waterford, MI (US); Craig D. Marriott, Clawson, MI (US); Joshua Cowgill, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 754 days.

(21) Appl. No.: 13/324,564

(22) Filed: Dec. 13, 2011

(65) Prior Publication Data

US 2013/0046452 A1 Feb. 21, 2013

Related U.S. Application Data

(60) Provisional application No. 61/523,690, filed on Aug. 15, 2011.

(51) Int. Cl.
*F02M 43/04* (2006.01)
*F02D 28/00* (2006.01)
(Continued)

(52) U.S. Cl.
CPC ............. *F02M 43/00* (2013.01); *F02D 19/061* (2013.01); *F02D 19/0647* (2013.01); *F02D 19/081* (2013.01); *F02D 41/0025* (2013.01); *F02D 19/0644* (2013.01); *F02D 19/0689* (2013.01);
(Continued)

(58) Field of Classification Search
CPC ........ F02M 43/04; F02D 28/00; F02D 19/10; F02D 41/00; F02D 41/26; F02D 41/40
USPC .......................................... 701/103; 123/299
See application file for complete search history.

(56) References Cited

U.S. PATENT DOCUMENTS 4,700,672 A  10/1987 Baguena
5,140,959 A   8/1992 Durbin
(Continued)

FOREIGN PATENT DOCUMENTS

CN       1648429 A    8/2005
CN     101057067 A   10/2007
(Continued)

OTHER PUBLICATIONS

Written Opinion of the International Searching Authority, for International Application No. PCT/US2012/050993, mailed Oct. 18, 2012.
(Continued)

*Primary Examiner* — Lindsay Low
*Assistant Examiner* — Xiao Mo

(57) ABSTRACT

A method for a multi-fuel vehicle includes: determining a first target amount of fuel to be injected for a combustion event of a combustion chamber of an engine; determining first and second fractions for the combustion event based on at least one of engine speed, engine load, and engine temperature; determining a second target amount of liquid fuel for the combustion event based on the first target amount and the first fraction; determining a third target amount of gaseous fuel for the combustion event based on the first target amount and the second fraction; selectively injecting a liquid fuel directly into the combustion chamber for the combustion event based on the second target amount and using a first fuel injector; and selectively injecting a gaseous fuel into a port of the combustion chamber for the combustion event based on the third target amount and using a second fuel injector.

16 Claims, 5 Drawing Sheets

(51) Int. Cl.
  *F02M 43/00* (2006.01)
  *F02D 19/06* (2006.01)
  *F02D 19/08* (2006.01)
  *F02D 41/00* (2006.01)
  *F02D 41/30* (2006.01)

(52) U.S. Cl.
  CPC ............ *F02D 19/0692* (2013.01); *F02D 19/084* (2013.01); *F02D 41/0027* (2013.01); *F02D 41/3094* (2013.01); *F02D 2200/021* (2013.01); *F02D 2200/101* (2013.01); *Y02T 10/36* (2013.01)

(56) References Cited

U.S. PATENT DOCUMENTS

| | | | |
|---|---|---|---|
| 5,379,740 A | 1/1995 | Moore et al. ............ 123/478 |
| 5,540,205 A | 7/1996 | Davis et al. ............ 123/486 |
| 5,771,857 A | 6/1998 | Willi | |
| 5,890,459 A | 4/1999 | Hedrick et al. | |
| 5,941,210 A | 8/1999 | Hill et al. | |
| 6,230,683 B1 | 5/2001 | zur Loye et al. | |
| 6,276,334 B1 | 8/2001 | Flynn et al. | |
| 6,276,347 B1 | 8/2001 | Hunt | |
| 6,286,482 B1 | 9/2001 | Flynn et al. | |
| 6,336,598 B1 | 1/2002 | Touchette et al. | |
| 6,554,091 B2 | 4/2003 | Mianzo et al. | |
| 6,561,157 B2 | 5/2003 | zur Loye et al. | |
| 6,694,242 B2 | 2/2004 | Wong | |
| 6,722,342 B2 | 4/2004 | Ogawa et al. | |
| 6,910,449 B2 | 6/2005 | Strom et al. | |
| 6,915,776 B2 | 7/2005 | zur Loye et al. | |
| 6,988,490 B2 | 1/2006 | Satou | |
| 7,000,596 B2 | 2/2006 | Zurloye et al. | |
| 7,055,506 B2 | 6/2006 | Kaiser et al. | |
| 7,162,995 B2 | 1/2007 | Munshi | |
| 7,201,146 B2 | 4/2007 | Araki | |
| 7,222,015 B2 | 5/2007 | Davis et al. | |
| 7,225,787 B2 | 6/2007 | Bromberg et al. | |
| 7,314,033 B2 | 1/2008 | Cohn et al. | |
| 7,377,267 B2 | 5/2008 | Boyer et al. | |
| 7,438,238 B2 | 10/2008 | Date et al. | |
| 7,451,942 B2 | 11/2008 | Borissov | |
| 7,461,633 B2 | 12/2008 | Vangraefschepe et al. | |
| 7,463,967 B2 | 12/2008 | Ancimer et al. | |
| 7,509,209 B2 | 3/2009 | Davis et al. | |
| 7,546,834 B1 | 6/2009 | Ulrey et al. | |
| 7,712,451 B2 | 5/2010 | Hung et al. | |
| 7,717,088 B2 | 5/2010 | Thomas | |
| 7,822,530 B2 | 10/2010 | Shinagawa et al. | |
| 7,832,381 B2 | 11/2010 | Pott et al. | |
| 7,845,334 B2 | 12/2010 | Lippa et al. | |
| 7,853,397 B2 | 12/2010 | Pott et al. | |
| 7,899,601 B2 | 3/2011 | Yun et al. | |
| 7,913,675 B2 | 3/2011 | Bailey et al. | |
| 7,946,273 B2 | 5/2011 | Lippa et al. | |
| 8,028,676 B2 | 10/2011 | Ancimer et al. | |
| 8,095,294 B1 | 1/2012 | Griffiths et al. | |
| 8,099,230 B2 | 1/2012 | Wermuth et al. | |
| 8,100,093 B2 | 1/2012 | Morgenstern | |
| 8,118,014 B2 | 2/2012 | Lippa et al. | |
| 8,180,556 B2 | 5/2012 | Cippitani | |
| 8,196,567 B2 | 6/2012 | Pursifull et al. | |
| 8,224,559 B2 | 7/2012 | Chang et al. | |
| 8,267,064 B2 | 9/2012 | Martin et al. | |
| 8,342,158 B2 | 1/2013 | Ulrey et al. | |
| 8,347,862 B2 | 1/2013 | Pursifull | |
| 8,396,644 B2 | 3/2013 | Kabashima et al. | |
| 8,413,643 B2 | 4/2013 | Pursifull et al. | |
| 8,459,576 B2 | 6/2013 | Kim et al. | |
| 8,662,024 B2 | 3/2014 | Leone | |
| 8,755,989 B2 | 6/2014 | Surnilla et al. | |
| 2002/0007816 A1 | 1/2002 | Zur Loye et al. | |
| 2002/0026926 A1 | 3/2002 | Loye et al. | |
| 2002/0195088 A1 | 12/2002 | Oprea | |
| 2003/0168037 A1 | 9/2003 | zur Loye et al. | |
| 2003/0221661 A1 | 12/2003 | Willi et al. | |
| 2004/0025831 A1* | 2/2004 | Landi et al. .............. 123/304 |
| 2004/0103860 A1 | 6/2004 | zur Loye et al. | |
| 2004/0118116 A1 | 6/2004 | Beck et al. | |
| 2004/0149255 A1 | 8/2004 | zur Loye et al. | |
| 2005/0000485 A1 | 1/2005 | Kuo et al. | |
| 2005/0178360 A1 | 8/2005 | Satou | |
| 2006/0047406 A1 | 3/2006 | Chatfield et al. | |
| 2006/0096577 A1 | 5/2006 | Araki | |
| 2007/0000456 A1 | 1/2007 | Wong | |
| 2007/0119421 A1 | 5/2007 | Lewis et al. | |
| 2007/0234976 A1 | 10/2007 | Dearth et al. | |
| 2008/0127950 A1 | 6/2008 | Malm | |
| 2009/0120385 A1 | 5/2009 | Munshi et al. | |
| 2009/0133379 A1 | 5/2009 | Mendoza et al. | |
| 2009/0254263 A1 | 10/2009 | Shimizu | |
| 2009/0272363 A1 | 11/2009 | Yun et al. | |
| 2009/0320790 A1 | 12/2009 | Lewis et al. | |
| 2010/0024770 A1 | 2/2010 | Pursifull et al. | |
| 2010/0024771 A1 | 2/2010 | Bidner et al. | |
| 2010/0024789 A1 | 2/2010 | Lippa et al. | |
| 2010/0030451 A1 | 2/2010 | Lippa et al. | |
| 2010/0043746 A1 | 2/2010 | Hartmann et al. | |
| 2010/0131177 A1 | 5/2010 | Pott et al. | |
| 2010/0131178 A1 | 5/2010 | Pott et al. | |
| 2010/0199948 A1 | 8/2010 | Rogak et al. | |
| 2011/0094593 A1 | 4/2011 | Malm | |
| 2011/0178693 A1 | 7/2011 | Chang et al. | |
| 2011/0288738 A1 | 11/2011 | Donnelly et al. | |
| 2012/0103306 A1 | 5/2012 | Livshits et al. | |
| 2012/0180766 A1 | 7/2012 | Malm | |
| 2013/0046453 A1 | 2/2013 | Cowgill | |
| 2013/0046454 A1 | 2/2013 | Cowgill et al. | |
| 2013/0174800 A1 | 7/2013 | Malm | |

FOREIGN PATENT DOCUMENTS

| | | | |
|---|---|---|---|
| CN | 102135043 A | 7/2011 | |
| DE | 102007025076 A1 | 12/2008 | |
| EP | 1555416 A1 | 7/2005 | |
| RU | 2292477 C1 | 1/2007 | |
| RU | 2347926 C1 | 2/2009 | |
| SU | 1554775 A3 | 3/1990 | |
| WO | WO-9404817 A1 | 3/1994 | |
| WO | WO2010/089568 A1 | 8/2010 | |
| WO | WO 2010089568 A1 * | 8/2010 | .............. F02D 41/00 |
| WO | WO-2013025833 A1 | 2/2013 | |
| WO | WO-2013025835 A1 | 2/2013 | |

OTHER PUBLICATIONS

Written Opinion of the International Searching Authority, for International Application No. PCT/US2012/050990, mailed Oct. 18, 2012.
Written Opinion of the International Searching Authority, for International Application No. PCT/US2012/050986, mailed Nov. 15, 2012.
U.S. Appl. No. 13/324,502, filed Dec. 13, 2011, Cowgill.
U.S. Appl. No. 13/324,532, filed Dec. 13, 2011, Cowgill et al.
"Driveline Release Coordination with Negative Crankshaft Torque," Research Disclosure Database No. 562059; Feb. 2011; 2 Pages.

* cited by examiner

MULTI-FUEL VEHICLE FUEL CONTROL
SYSTEMS AND METHODS

CROSS-REFERENCE TO RELATED
APPLICATIONS

This application claims the benefit of U.S. Provisional Application No. 61/523,690, filed on Aug. 15, 2011. The disclosure of the above application is incorporated herein by reference in its entirety.

This application is related to United States patent application Ser. Nos. 13/324,502, filed on Dec. 13, 2011 and 13/324,532, filed on Dec. 13, 2011. The disclosure of the above applications is incorporated herein by reference in their entirety.

FIELD

The present disclosure relates to internal combustion engines and more particularly to fuel control systems and methods for multi-fuel vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditionally, an engine combusts a mixture of air and fuel delivered by one fuel system to generate drive torque for a vehicle. For example only, the fuel may be gasoline, diesel fuel, or another suitable type of fuel. The air is drawn into the engine through a throttle valve and an intake manifold. The fuel is provided by one or more fuel injectors. The air/fuel mixture is combusted within one or more cylinders of the engine. Combustion of the air/fuel mixture may be initiated by, for example, injection of the fuel and/or spark provided by a spark plug. Combustion of the air/fuel mixture produces exhaust gas. The exhaust gas is expelled from the cylinders to an exhaust system.

Bi-fuel vehicles are capable of combusting fuel delivered via two different fuel systems. Multi-fuel vehicles include two or more fuel systems. For example only, a direct fuel injection fuel system may inject fuel directly into combustion chambers. A port fuel injection fuel system may inject fuel into ports associated with the combustion chambers, respectively. The two fuel systems are generally used as alternatives to one another where only one of the two fuel systems delivers fuel for a given combustion event.

SUMMARY

A target fueling module determines a first target amount of fuel to be injected for a combustion event of a combustion chamber of an engine. First and second fraction modules determine first and second fractions for the combustion event based on at least one of an engine speed, an engine load, and an engine temperature. A liquid fueling determination module determines a second target amount of liquid fuel for the combustion event based on the first target amount and the first fraction. A gaseous fueling determination module determines a third target amount of gaseous fuel for the combustion event based on the first target amount and the second fraction. A liquid injection control module selectively injects a liquid fuel directly into the combustion chamber for the combustion event based on the second target amount and using a first fuel injector. A gaseous injection control module selectively injects a gaseous fuel into a port of the combustion chamber for the combustion event based on the third target amount and using a second fuel injector.

In other features, a method for a multi-fuel vehicle includes: determining a first target amount of fuel to be injected for a combustion event of a combustion chamber of an engine; determining first and second fractions for the combustion event based on at least one of an engine speed, an engine load, and an engine temperature; determining a second target amount of liquid fuel for the combustion event based on the first target amount and the first fraction; determining a third target amount of gaseous fuel for the combustion event based on the first target amount and the second fraction; selectively injecting a liquid fuel directly into the combustion chamber for the combustion event based on the second target amount and using a first fuel injector; and selectively injecting a gaseous fuel into a port of the combustion chamber for the combustion event based on the third target amount and using a second fuel injector.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
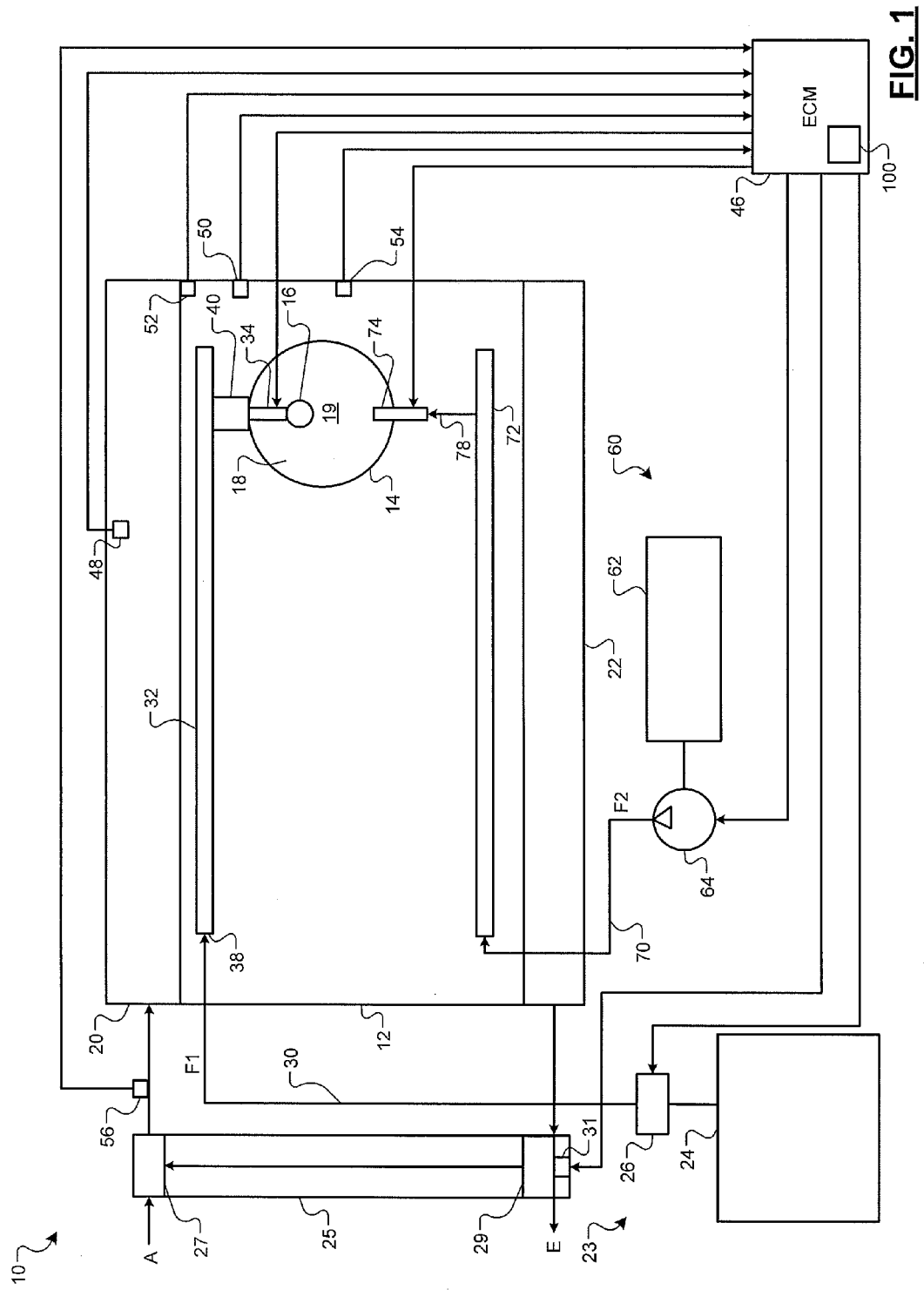
FIG. 1 is a functional block diagram of an example engine system of a bi-fuel vehicle according to the present disclosure.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine system includes two or more fuel injection systems, such as first and second fuel injection systems. The first fuel injection system may inject a first fuel into ports associated with combustion chambers of an engine. The first fuel may be a gaseous fuel, such as compressed natural gas (CNG), liquefied petroleum gas (LPG), or hydrogen, or another suitable type of fuel. A second fuel injection system may directly inject a second fuel into the combustion chambers. The second fuel may be a liquid fuel, such as gasoline or diesel fuel, or another suitable type of fuel. A control module controls amount and timing of injections of the first and second fuels.

Combustion of a gaseous fuel may provide engine knock minimizing qualities. However, a gaseous fuel may decrease volumetric efficiency relative to a liquid fuel, and injection of a gaseous fuel may fail to provide charge cooling similar to that provided by a liquid fuel. Injection of a gaseous fuel may, however, decrease one or more components of exhaust relative to liquid fuel under some circumstances, such as when a temperature of the engine is low. The control module may control the injections of the first and second fuels to maximize the benefits provided by both fuels under the operating conditions.

The control module may determine a target amount of fuel to be injected for a combustion event of a combustion chamber. The control module may determine fractions of the target amount that should be provided via injection of the first fuel and injection of the second fuel. The control module may determine the fractions based on one or more operating conditions, such as engine speed, engine load, and engine temperature.

Referring now to the FIG. 1, a functional block diagram of an example engine system 10 is presented. The engine system 10 includes a bi-fuel engine assembly of a vehicle that is capable of combusting fuel injected via two different fuel injection systems. Vapor purge systems (also known as an evaporative emissions system) are not a fuel injection system for the purposes of the present disclosure, for example, because vapor purge systems do not include fuel injectors.

The engine system 10 may include an engine structure 12, an intake manifold 20, an exhaust manifold 22, a first fuel system 23, a second fuel system 60, and other suitable engine components. The engine structure 12 may include an engine block that defines cylinder bores, such as cylinder bore 14, and a cylinder head that defines injection ports, such as injection port 16.

The cylinder bores and the cylinder head may collectively define combustion chambers, such as combustion chamber 19. While the engine system 10 is illustrated as including only one cylinder, the engine system 10 may include more than one cylinder. The present disclosure is applicable to engines having a greater or fewer number of cylinders and to engines having cylinders arranged in an inline configuration, a V-type configuration, or another suitable configuration.

Pistons, such as piston 18, may be disposed within the cylinder bores for reciprocal displacement within the cylinder bores. Reciprocation of the pistons drives a crankshaft (not shown). The intake manifold 20 may be in communication with the combustion chambers to provide fresh airflow (indicated by arrow A) into the combustion chambers. The exhaust manifold 22 may be in communication with the combustion chambers to transport exhaust gases (indicated by arrow E) away from the combustion chambers.

A turbocharger 25 may be provided in various implementations. The turbocharger 25 includes a compressor (or impeller) 27 and a turbine 29. Exhaust flow drives rotation of the turbine 29. Rotation of the turbine 29 causes rotation of the compressor 27. The compressor 27 provides compressed air to the intake manifold 20. Opening of a wastegate 31 may be controlled to regulate an amount of exhaust bypassing the turbine 29. Opening of the wastegate 31 may be controlled to regulate the output of the compressor 27. The output of the compressor 27 may be controlled in another suitable manner for different types of turbochargers, such as variable nozzle turbochargers, variable vane turbochargers, etc. In various implementations, zero turbochargers or multiple turbochargers may be provided.

The first fuel system 23 may include a first fuel tank 24, a pressure regulation device 26, a first fuel supply line 30, and a first fuel rail 32. A gaseous fuel, such as LPG, CNG, or hydrogen, or another suitable fuel, may be stored in the first fuel tank 24. Gaseous fuels are generally compressed within a fuel tank to greater than atmospheric pressure. The pressure regulation device 26 may regulate flow (indicated by arrow F1) from the first fuel tank 24 to the first fuel rail 32. The pressure regulation device 26 may include a pump, a valve, or another suitable pressure regulation device.

The first fuel rail 32 may include an inlet 38 where the first fuel rail 32 receives gaseous fuel from the first fuel supply line 30. The first fuel rail 32 may receive gaseous fuel from the pressure regulation device 26 and distribute gaseous fuel to injectors of the gaseous fuel, such as gaseous fuel injector 34. Injectors of gaseous fuel will be referred to as gaseous fuel injectors. A gaseous fuel injector may be provided for each cylinder/combustion chamber.

The first fuel rail 32 may also include fuel passageways, such as fuel passageway 40. The gaseous fuel injector 34 receives gaseous fuel from the first fuel rail 32 via the fuel passageway 40. The gaseous fuel injector 34 (indirectly) provides the gaseous fuel to the combustion chamber 19. For example only, the gaseous fuel injector 34 may inject gaseous fuel into the injection port 16. Movement of the piston 18 within the cylinder bore 14 may create a vacuum that draws injected gaseous fuel from the injection port 16 into the combustion chamber 19.

The second fuel system 60 may include a second fuel tank 62, a fuel pump 64, a second fuel rail 72, and a second fuel supply line 70. A liquid fuel, such as gasoline, a gasoline/ethanol blend, diesel fuel, or another suitable liquid fuel may be stored within the second fuel tank 62. The liquid fuel may be the same as or different than the gaseous fuel. In various implementations, gasoline (in liquid form) may also be used in place of the gaseous fuel and injected into the injection port 16. The fuel pump 64 may generate a fuel flow (indicated by arrow F2) from the second fuel tank 62 to the second fuel rail 72. The fuel pump 64 may be an electrical fuel pump or a mechanical fuel pump. In various implementations, one or more additional fuel pumps may be provided.

The second fuel rail 72 may distribute liquid fuel to injectors of the liquid fuel, such as liquid fuel injector 74, via secondary fuel supply lines, such as secondary fuel supply line 78. Injectors of liquid fuel will be referred to as liquid fuel injectors. The liquid fuel injector 74 may inject liquid fuel directly into the combustion chamber 19. A liquid fuel injector may be provided for each cylinder/combustion chamber.

Engines where fuel is injected directly into the combustion chambers may be referred to as direct injection (DI) engines. In various types of engines, spark plugs (not shown) may be provided to initiate combustion of air and fuel within the combustion chambers. Engines where spark initiates combustion and fuel is injected directly into the combustion chambers may be referred to as spark ignition direct injection (SIDI) engines. In various types of engines, such as diesel DI engines, spark plugs may be omitted.

The engine system 10 may further include an engine control module (ECM) 46, a manifold absolute pressure (MAP) sensor 48, a coolant temperature sensor 50, an oil temperature sensor 52, a crankshaft position sensor 54, a mass air flowrate (MAF) sensor 56, and one or more other suitable sensors. The MAP sensor 48 may measure a pressure within the intake manifold 20 and generate a MAP signal based on the pressure. The coolant temperature sensor 50 may measure a temperature of engine coolant and generate a coolant temperature signal based on the temperature of the engine coolant.

The oil temperature sensor 52 may measure a temperature of engine oil and generate an oil temperature signal based on the temperature of the engine oil. The crankshaft position sensor 54 monitors rotation of the crankshaft and generates a crankshaft position signal based on the rotation of the crankshaft. The MAF sensor 56 measures a mass flowrate of air flowing into the intake manifold 20 and generates a MAF signal based on the mass flowrate of air.

The ECM 46 may include a fuel control module 100. The fuel control module 100 controls the liquid fuel injector 74 to control the amount (e.g., mass) of liquid fuel injected into the combustion chamber 19 and when liquid fuel is injected. The fuel control module 100 may also control the gaseous fuel injector 34 to control the amount (e.g., mass) of gaseous fuel injected and when gaseous fuel is injected. The fuel control module 100 may control the injection of the gaseous and liquid fuels, for example, to achieve a target air/fuel mixture, such as a stoichiometric air/fuel mixture.

Injection of gaseous fuel reduces the volumetric efficiency of the engine relative to liquid fuel injection because, when combined with air within a combustion chamber, more air is displaced by gaseous fuel than liquid fuel. Gaseous fuel may also not provide a cooling effect similar to the cooling effect provided by liquid fuel. Combustion of a charge of air and gaseous fuel may accordingly reduce engine torque output relative to combustion of a charge of air and liquid fuel.

In addition, combustion of a charge of air and gaseous fuel may produce hotter exhaust gas than combustion of a charge of air and liquid fuel. The mixture of air and gaseous fuel may be leaned (fuel wise) to produce cooler exhaust gas. The leaning may cause a further reduction in engine torque output.

However, combustion of gaseous fuel may provide one or more benefits over liquid fuel. For example only, combustion of gaseous fuel may minimize (or prevent) engine knock. For another example only, combustion of gaseous fuel may decrease the concentration of one or more components of the exhaust gas (e.g., particulates, unburned hydrocarbons, etc.) under some circumstances (e.g., at engine temperatures that are less than a predetermined temperature).

The fuel control module 100 controls the amounts of the gaseous and liquid fuels injected for each combustion event to maximize the knock minimizing qualities of gaseous fuel while maximizing the charge cooling and volumetric efficiency increasing qualities of liquid fuel. In addition to minimizing knock and increasing volumetric efficiency, controlling the amounts of the gaseous and liquid fuels injected may prevent one or more engine related components (e.g., liquid fuel injectors, turbine, piston, catalyst, etc.) from experiencing over-temperature situations and decrease the concentration of one or more components of the exhaust.

Figure 2:
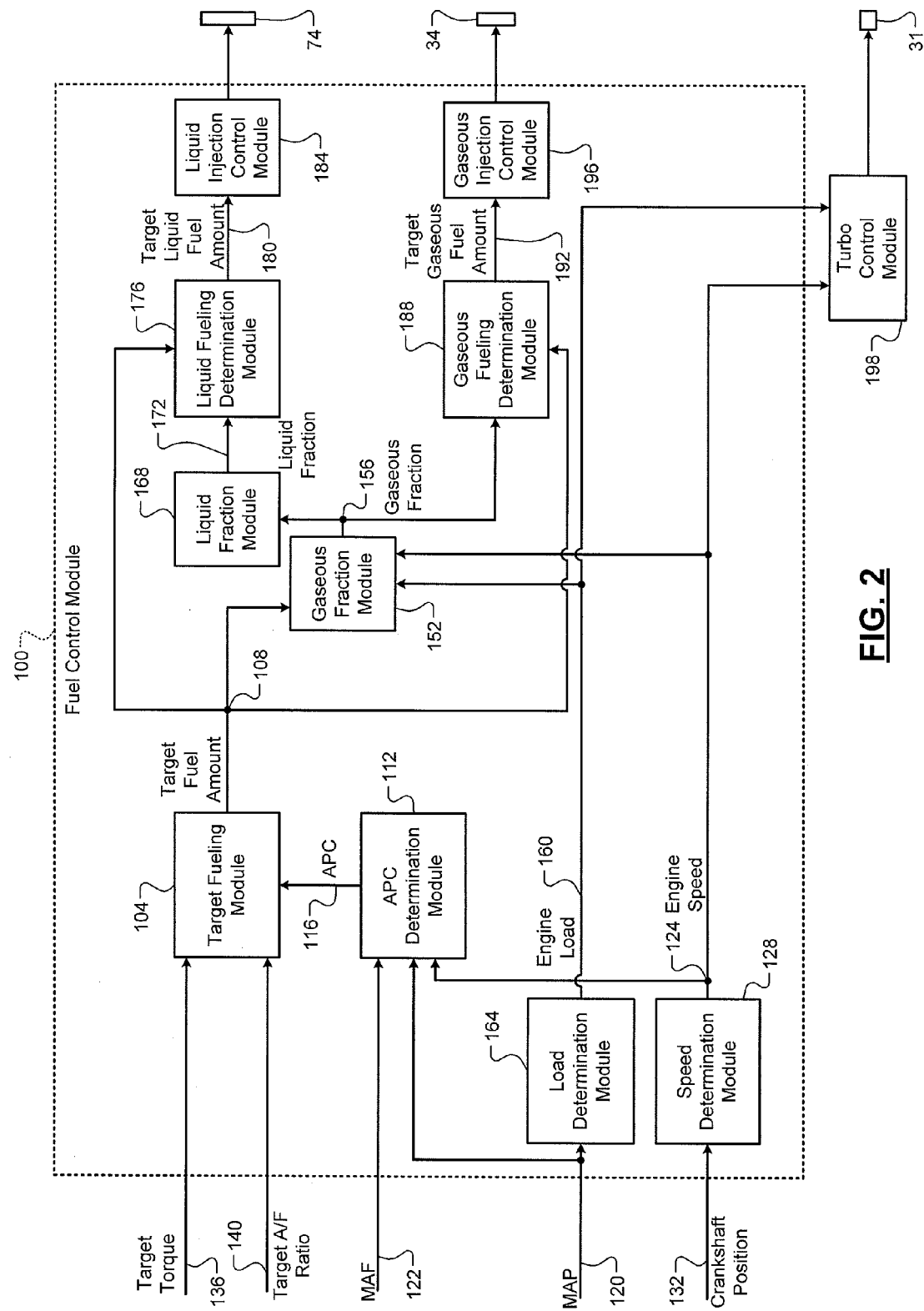
FIG. 2 is a functional block diagram of an example engine control system according to the present disclosure.

Referring now to FIG. 2, a functional block diagram of an example implementation of an engine control system is presented. A target fueling module 104 may determine a target amount (e.g., mass) of fuel to be injected for a combustion event that will occur within the combustion chamber 19. The target amount of fuel to be injected for the combustion event will be referred to as a target fuel amount 108. The target fuel amount 108 may represent a combined amount of the gaseous and liquid fuels that is to be injected for the combustion event.

An air per cylinder (APC) determination module 112 may determine an amount (e.g., mass) of air that will be present within the combustion chamber 19 for the combustion event. The amount of air that will be present within the combustion chamber 19 during the combustion event will be referred to as air per cylinder (APC) 116.

The APC determination module 112 may determine the APC 116, for example, based on a MAP 120 measured using the MAP sensor 48, an engine speed 124, and/or one or more other suitable parameters. In various implementations, the APC determination module 112 may determine the APC 116 based on a MAF 122 measured using the MAF sensor 56. In other implementations, the APC 116 may be a commanded APC and may be determined, for example, based on one or more driver inputs (e.g., accelerator pedal position). A speed determination module 128 may determine the engine speed 124, for example, based on a crankshaft position 132 measured using the crankshaft position sensor 54.

The target fueling module 104 may generate the target fuel amount 108 for the combustion event, for example, to achieve a target torque 136 and a target air/fuel ratio 140 with the APC 116. The target torque 136 may be set, for example, based on one or more driver inputs. The target air/fuel ratio 140 may be set, for example, based on a stoichiometric air/fuel ratio. The target fueling module 104 may generate the target fuel amount 108 for the combustion event, for example, as a function of the target torque 136, the target air/fuel ratio 140, the APC 116, and one or more other suitable parameters.

A gaseous fraction module 152 determines a fraction of the target fuel amount 108 for the combustion event that should be provided via injection of gaseous fuel. The fraction of the target fuel amount 108 that will be injected for the combustion event that should be provided via injection of gaseous fuel will be referred to as a gaseous fraction 156. For example only, the gaseous fraction 156 may be expressed a value between 0.0 and 1.0, inclusive. If the gaseous fraction 156 is equal to 1.0, the target fuel amount 108 may be provided using only gaseous fuel injection (and none of the liquid fuel). If the gaseous fraction 156 is equal to 0.0, the target fuel amount 108 may be injected using only liquid fuel injection (and none of the gaseous fuel).

The gaseous fraction module 152 may determine the gaseous fraction 156 based on the engine speed 124, an engine load 160, and/or one or more other suitable parameters. For example only, the gaseous fraction module 152 may decrease the gaseous fraction 156 as the engine speed 124 increases and vice versa. Additionally or alternatively, the gaseous fraction module 152 may decrease the gaseous fraction 156 as the engine load 160 increases and vice versa.

A load determination module 164 may determine the engine load 160, for example, based on the MAP 120 and/or one or more other suitable parameters. In various implementations, the engine load 160 may be a commanded engine load and may be determined based on, for example, one or more driver inputs and/or one or more other suitable parameters.

When the engine speed 124 is low and the engine load 160 is high, the gaseous fraction 156 may be set such that the amounts of gaseous and liquid fuels injected provide the knock minimizing quality of gaseous fuel and provide the charge cooling and volumetric efficiency increasing qualities of liquid fuel. The engine speed 124 may be considered low when the engine speed 124 is less than a predetermined speed. For example only, the predetermined speed may be less than approximately 3000 revolutions per minute (rpm), less than approximately 4000 rpm, or another suitable speed. The engine load 160 may be considered high when the engine load 160 is greater than a predetermined percentage of a peak torque. For example only, the predetermined percentage may be approximately 50 percent or another suitable percentage.

When the engine speed 124 is high and the engine load 160 is high, the gaseous fraction 156 may be set such that the amounts of gaseous and liquid fuel is injected to increase volumetric efficiency, provide charge cooling, and provide cooler exhaust. The engine speed 124 may be considered high when the engine speed 124 is greater than the predetermined speed.

When the engine load 160 is low, the gaseous fraction 156 may be set based on carbon dioxide ($CO_2$) produced by each of the liquid and gaseous fuels, volumetric efficiency changes attributable to use of each of the liquid and gaseous fuels, and/or cost of each of the fuels. With these conditions in mind, the gaseous fraction 156 may increase when the engine load 160 is low. The engine load 160 may be considered low when the engine load 160 is less than the predetermined percentage of the peak torque.

A liquid fraction module 168 determines a fraction of the target fuel amount 108 for the combustion event that should be provided via liquid fuel injection. The fraction of the target fuel amount 108 for the combustion event that should be provided via liquid fuel injection will be referred to as a liquid fraction 172. For example only, like the gaseous fraction 156, the liquid fraction 172 may be expressed a value between 0.0 and 1.0, inclusive.

The liquid fraction module 168 may determine the liquid fraction 172 based on the gaseous fraction 156. The liquid fraction module 168 may, for example, set the liquid fraction 172 equal to 1.0 minus the gaseous fraction 156. In this manner, the liquid fraction 172 and the gaseous fraction 156 represent the fractions (between 0.0 and 1.0) of the whole target fuel amount 108 that should be provided via liquid and gaseous fuel injection, respectively. A sum of the liquid fraction 172 and the gaseous fraction 156 may be equal to 1.0.

A liquid fueling determination module 176 may determine a target amount of liquid fuel to be injected for the combustion event based on the target fuel amount 108 and the liquid fraction 172. The target amount of liquid fuel to be injected for the combustion event will be referred to as a target liquid fuel amount 180. The liquid fueling determination module 176 may, for example, set the target liquid fuel amount 180 equal to a product of the target fuel amount 108 and the liquid fraction 172. A liquid injection control module 184 controls the liquid fuel injector 74 such that an amount of liquid fuel that is equal to the target liquid fuel amount 180 is injected into the combustion chamber 19 for the combustion event.

A gaseous fueling determination module 188 determines a target amount of gaseous fuel to be injected for the combustion event based on the target fuel amount 108 and the gaseous fraction 156. The target amount of gaseous fuel to be injected for the combustion event will be referred to as a target gaseous fuel amount 192. The gaseous fueling determination module 188 may, for example, set the target gaseous fuel amount 192 equal to a product of the target fuel amount 108 and the gaseous fraction 156. A gaseous injection control module 196 controls the gaseous fuel injector 34 such that an amount of gaseous fuel that is equal to the target gaseous fuel amount 192 is injected for the combustion event. For example only, the liquid injection control module 184 and the gaseous injection control module 196 may control the liquid fuel injector 74 and the gaseous fuel injector 34, respectively, using pulse width modulation (PWM).

The ECM 46 may also include a turbo control module 198 that controls the output of the compressor 27. The turbo control module 198 may selectively increase the output of the compressor 27. For example only, the turbo control module 198 may increase the output of the compressor 27 when the engine speed 124 is low and the engine load 160 is high. Increasing the output of the compressor 27 increases the MAP 120, the engine load 160, and the APC 116.

However, increasing the output of the compressor 27 may cause gaseous fuel (if already injected) to be forced out of the combustion chamber 19 before being burnt. When the engine speed 124 is low and the engine load 160 is high, the turbo control module 198 may increase the output of the compressor 27 to increase airflow passing through the combustion chamber 19 before the combustion chamber 19 is sealed for a combustion event. While the output of the compressor 27 is increased, the gaseous injection control module 196 may wait to inject gaseous fuel until one or more exhaust valves (not shown) of the combustion chamber 19 are closed for the combustion event. The turbo control module 198 may limit instances of increasing the output of the compressor 27 to when the engine speed 124 is low.

Figure 3:
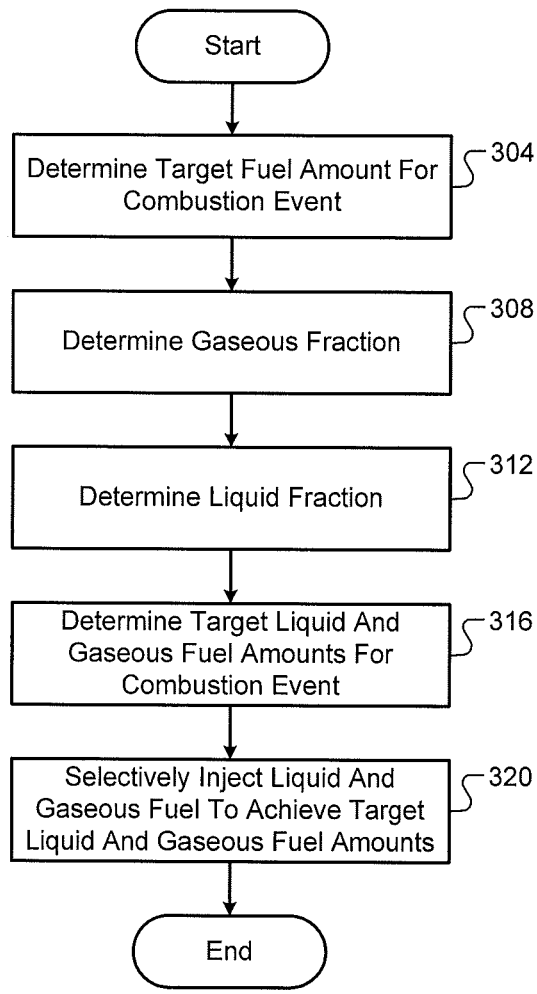
FIG. 3 is a flowchart depicting an example method of controlling amounts of gaseous and liquid fuels injected using first and second fuel systems according to the present disclosure.

Referring now to FIG. 3, a flowchart depicting an example method of controlling the amounts of liquid and gaseous fuel injected for a combustion event is presented. Control may begin with 304 where control determines the target fuel amount 108 for a combustion event within the combustion chamber 19. Control may determine the target fuel amount 108, for example, based on the target torque 136, the target air/fuel ratio 140, the APC 116 for the combustion event, and one or more other suitable parameters.

Control may determine the gaseous fraction 156 at 308. Control may determine the gaseous fraction 156 based on the engine speed 124, the engine load 160, and/or one or more other suitable parameters. The gaseous fraction 156 may be a value between 0.0 and 1.0. Control may determine the liquid fraction 172 at 312 based on the gaseous fraction 156. For example only, control may set the liquid fraction 172 equal to 1.0 minus the gaseous fraction 156. In this manner, the liquid fraction 172 may too be determined based on the engine speed 124 and/or the engine load 160.

At 316, control may determine the target liquid fuel amount 180 and the target gaseous fuel amount 192 for the combustion event. Control may determine the target liquid fuel amount 180 based on the liquid fraction 172 and the target fuel amount 108. For example only, control may set the target liquid fuel amount 180 equal to the product of the target fuel amount 108 and the liquid fraction 172. Control may determine the target gaseous fuel amount 192 based on the gaseous fraction 156 and the target fuel amount 108. For example only, control may set the target gaseous fuel amount 192 equal to the product of the target fuel amount 108 and the gaseous fraction 156. At 320, control selectively controls the liquid and gaseous fuel injectors 74 and 34 to inject the target liquid and gaseous fuel amounts 180 and 192, respectively, at desired times for the combustion event. In this manner, the gaseous and liquid fuels are injected in amounts that utilize the beneficial qualities of both fuels.

Figure 4:
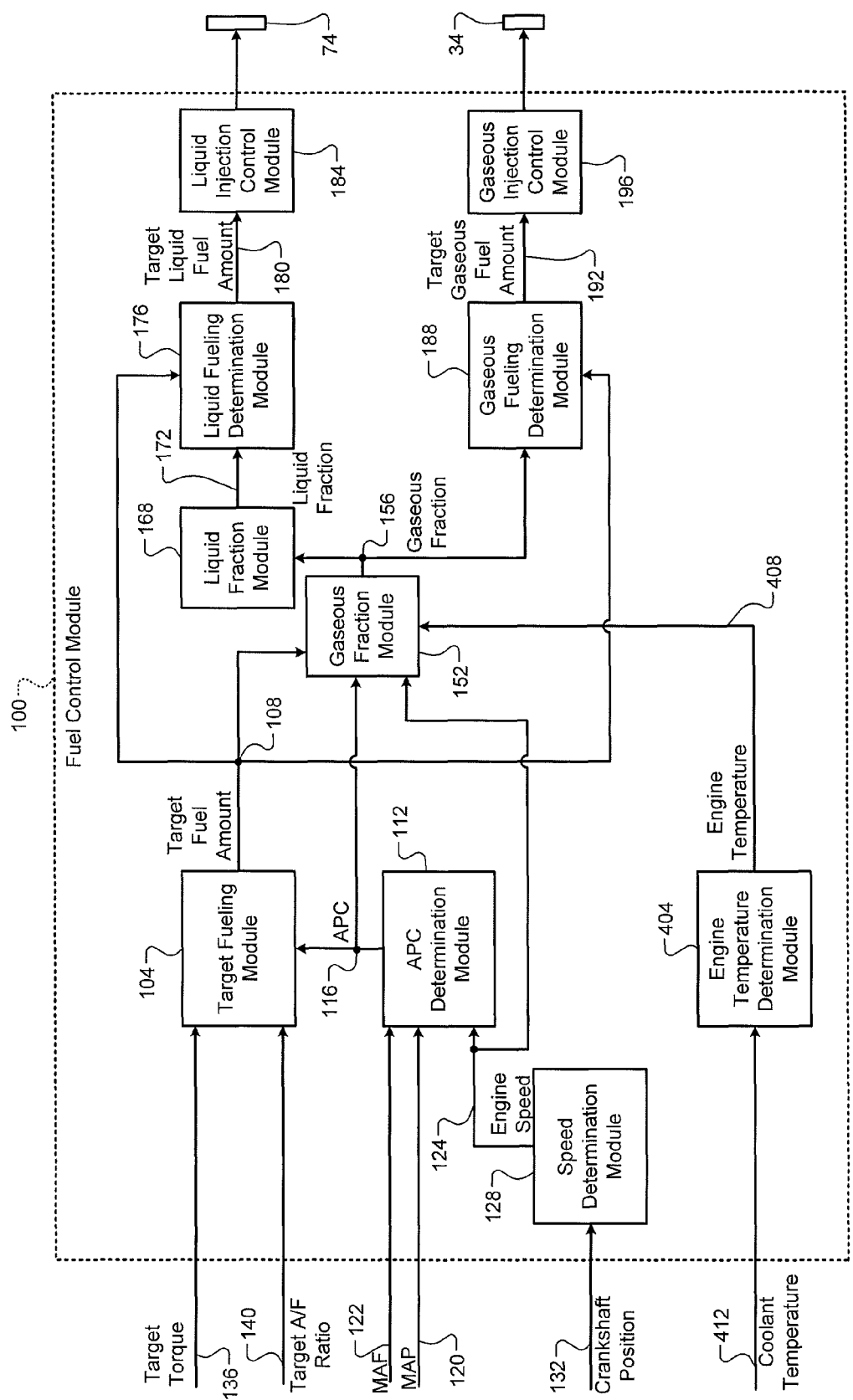
FIG. 4 is a functional block diagram of another example engine control system according to the present disclosure.

Referring now to FIG. 4, a functional block diagram of another example implementation of an engine control system is presented. While the examples of FIGS. 2 and 4 are illustrated separately, the concepts described in conjunction with FIGS. 2 and 4 may be used together.

An engine temperature determination module 404 may determine a temperature of the engine structure 12. The temperature of the engine structure 12 will be referred to as engine temperature 408. The engine temperature 408 may be representative of a temperature of the combustion chamber 19 or another suitable temperature of the engine.

The engine temperature determination module 404 may determine the engine temperature 408 based on an engine coolant temperature 412 measured using the coolant temperature sensor 50. For example only, the engine temperature determination module 404 may determine the engine temperature 408 using a function or a mapping that relates the engine coolant temperature 412 to the engine temperature 408. Additionally or alternatively, the engine temperature determination module 404 may determine the engine temperature 408 based on an oil temperature (not shown) measured using the oil temperature sensor 52 and/or one or more other suitable parameters. In various implementations, the engine coolant temperature 412 may be used as the engine temperature 408.

The gaseous fraction module 152 may determine the gaseous fraction 156 for the combustion event. The gaseous fraction module 152 may determine the gaseous fraction 156 based on the engine temperature 408, the engine speed 124, and the APC 116. The gaseous fraction module 152 may determine the gaseous fraction 156 using one of a function and a mapping that relates the engine temperature 408, the engine speed 124, and the APC 116 to the gaseous fraction 156. For example only, the gaseous fraction module 152 may increase the gaseous fraction 156 as the engine temperature 408 decreases and vice versa. Increasing the amount of gaseous fuel injected when the engine temperature 408 is low (and correspondingly decreasing the amount of liquid fuel injected) may decrease the concentration of one or more components of the exhaust (e.g., particulate matter, unburned hydrocarbons, etc.) relative to if more liquid fuel was injected.

In various implementations, the gaseous fraction module 152 may determine first and second gaseous fractions (not shown) based on the engine speed 124 and the APC 116. The gaseous fraction module 152 may determine the first gaseous fraction further based on a predetermined minimum value of the engine temperature 408. The gaseous fraction module 152 may determine the second gaseous fraction further based on a predetermined maximum value of the engine temperature 408. The gaseous fraction module 152 may determine the gaseous fraction 156 based on the first and second gaseous fractions and the engine temperature 408. For example only, based on the engine temperature 408 relative to the predetermined minimum and maximum values, the gaseous fraction module 152 may determine the gaseous fraction 156 by interpolating between the first and second gaseous fractions. The interpolation may be linear or non-linear.

Figure 5:
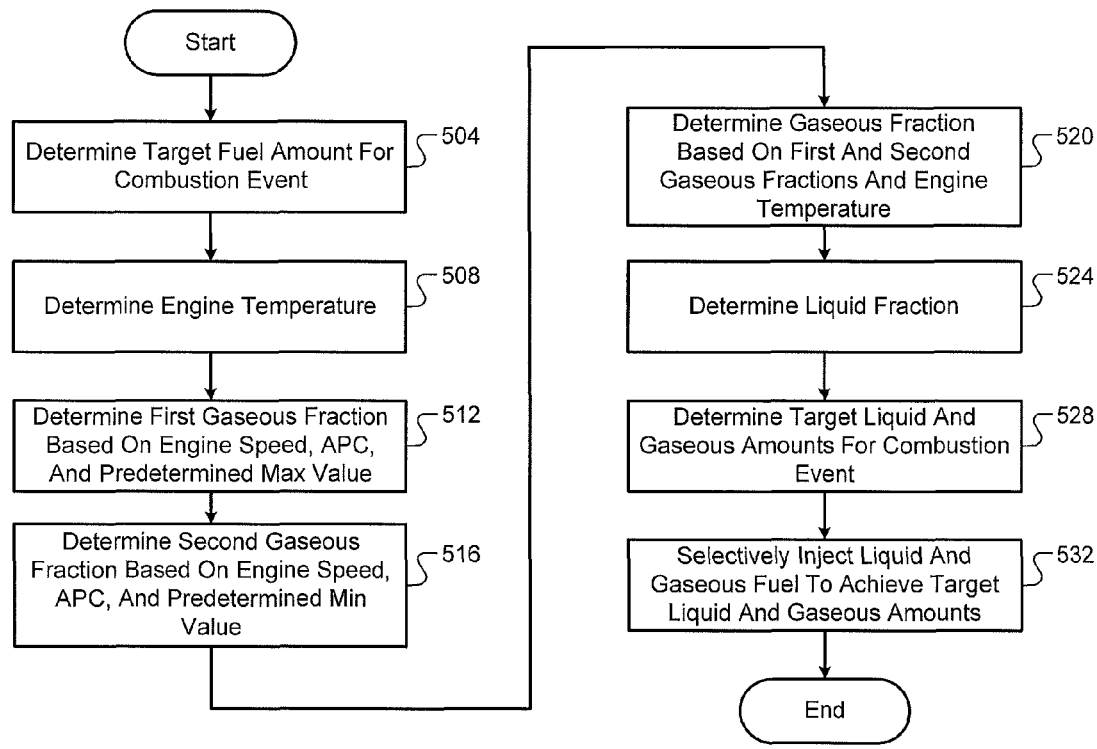
FIG. 5 is a flowchart depicting another example method of controlling amounts of gaseous and liquid fuels injected using first and second fuel systems according to the present disclosure.

Referring now to FIG. 5, a flowchart depicting another example method of controlling the amounts of liquid and gaseous fuel injected for a combustion event is presented. Control may begin with 504 where control determines the target fuel amount 108 for a combustion event within the combustion chamber 19. Control may determine the target fuel amount 108, for example, based on the target torque 136, the target air/fuel ratio 140, the APC 116 for the combustion event, and one or more other suitable parameters.

Control may determine the engine temperature 408 at 508. Control may determine the engine temperature 408, for example, as a function of the engine coolant temperature 412. In various implementations, the engine coolant temperature 412 may be used as the engine temperature 408.

Control may determine the first gaseous fraction at 512. Control may determine the first gaseous fraction as a function of the engine speed 124, the APC 116, and the predetermined minimum value of the engine temperature 408. Control may determine the second gaseous fraction at 516. Control may determine the second gaseous fraction as a function of the engine speed 124, the APC 116, and the predetermined maximum value of the engine temperature 408.

At 520, control may determine the gaseous fraction 156. Control may determine the gaseous fraction 156 based on the first gaseous fraction, the second gaseous fraction, and the engine temperature 408. For example only, control may determine the gaseous fraction 156 by interpolating between the first and second gaseous fractions based on the engine temperature 408 relative to the predetermined minimum and maximum values.

Control may determine the liquid fraction 172 at 524 based on the gaseous fraction 156. For example only, control may set the liquid fraction 172 equal to 1.0 minus the gaseous fraction 156. At 528, control may determine the target liquid fuel amount 180 and the target gaseous fuel amount 192 for the combustion event. Control may determine the target liquid fuel amount 180 based on the liquid fraction 172 and the target fuel amount 108. For example only, control may set the target liquid fuel amount 180 equal to the product of the target fuel amount 108 and the liquid fraction 172. Control may determine the target gaseous fuel amount 192 based on the gaseous fraction 156 and the target fuel amount 108. For example only, control may set the target gaseous fuel amount 192 equal to the product of the target fuel amount 108 and the gaseous fraction 156.

At 532, control selectively controls the liquid and gaseous fuel injectors 74 and 34 to inject the target liquid and gaseous fuel amounts 180 and 192, respectively, at desired times for the combustion event. Controlling the target liquid and gaseous fuel amounts 180 and 192 may decrease the concentrations of one or more components of the exhaust, such as particulates, unburned hydrocarbons, etc.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a multi-fuel vehicle, comprising:
a target fueling module that determines a first target amount of fuel to be injected for a combustion event of a combustion chamber of an engine;
a first and second fraction modules that determine first and second fractions for the combustion event based on an engine temperature,
wherein the second fraction module determines the second fraction using interpolation based on the engine temperature relative to a predetermined minimum value of the engine temperature and a predetermined maximum value of the engine temperature, and
wherein the first fraction module determines the first fraction as a function of the second fraction;
a liquid fueling determination module that sets a second target amount of liquid fuel for the combustion event based on a first product of the first target amount and the first fraction;
a gaseous fueling determination module that sets a third target amount of gaseous fuel for the combustion event based on a second product of the first target amount and the second fraction;
a liquid injection control module that selectively injects a liquid fuel directly into the combustion chamber for the combustion event based on the second target amount and using a first fuel injector; and
a gaseous injection control module that selectively injects a gaseous fuel into a port of the combustion chamber for the combustion event based on the third target amount and using a second fuel injector.

2. The system of claim 1 wherein the first and second fraction modules determine the first and second fractions for the combustion event further based on an engine speed and an engine load.

3. The system of claim 1 wherein:
the second fraction module increases the second fraction as the engine temperature decreases; and
the first fraction module decreases the first fraction as the engine temperature decreases.

4. The system of claim 1 further comprising an engine temperature determination module that determines the engine temperature as a function of a coolant temperature measured using a coolant temperature sensor.

5. The system of claim 1 wherein the engine temperature is a coolant temperature measured using a coolant temperature sensor.

6. The system of claim 1 wherein the liquid fuel is one of gasoline and diesel fuel.

7. The system of claim 6 wherein the gaseous fuel is one of compressed natural gas and liquefied petroleum gas.

8. The system of claim 1 wherein:
the first and second fractions are values between 0.0 and 1.0, inclusive; and
the first fraction module sets the first fraction equal to 1.0 minus the second fraction.

9. A method for a multi-fuel vehicle, comprising:
determining a first target amount of fuel to be injected for a combustion event of a combustion chamber of an engine;
determining first and second fractions for the combustion event based on an engine temperature,
wherein determining the second fraction includes determining the second fraction using interpolation based on the engine temperature relative to a predetermined minimum value of the engine temperature and a predetermined maximum value of the engine temperature, and
wherein determining the first fraction includes determining the first fraction as a function of the second fraction;
setting a second target amount of liquid fuel for the combustion event based on a first product of the first target amount and the first fraction;
setting a third target amount of gaseous fuel for the combustion event based on to a second product of the first target amount and the second fraction;
selectively injecting a liquid fuel directly into the combustion chamber for the combustion event based on the second target amount and using a first fuel injector; and
selectively injecting a gaseous fuel into a port of the combustion chamber for the combustion event based on the third target amount and using a second fuel injector.

10. The method of claim 9 further comprising determining the first and second fractions for the combustion event further based on an engine speed and an engine load.

11. The method of claim 9 further comprising:
increasing the second fraction as the engine temperature decreases; and
decreasing the first fraction as the engine temperature decreases.

12. The method of claim 9 further comprising determining the engine temperature as a function of a coolant temperature measured using a coolant temperature sensor.

13. The method of claim 9 wherein the engine temperature is a coolant temperature measured using a coolant temperature sensor.

14. The method of claim 9 wherein the liquid fuel is one of gasoline and diesel fuel.

15. The method of claim 14 wherein the gaseous fuel is one of compressed natural gas and liquefied petroleum gas.

16. The method of claim 9 further comprising setting the first fraction equal to 1.0 minus the second fraction, wherein the first and second fractions are values between 0.0 and 1.0, inclusive.

* * * * *